US012738118B2

(12) United States Patent
Mohanta

(10) Patent No.: US 12,738,118 B2
(45) Date of Patent: Sep. 15, 2026

(54) ELECTRONIC VOTING SYSTEM

(71) Applicant: Akash Mohanta, Quakers Hill (AU)

(72) Inventor: Akash Mohanta, Quakers Hill (AU)

( * ) Notice: Subject to any disclaimer, the term of this patent is extended or adjusted under 35 U.S.C. 154(b) by 0 days.

(21) Appl. No.: 19/155,414

(22) PCT Filed: Feb. 22, 2024

(86) PCT No.: PCT/AU2024/050134
§ 371 (c)(1),
(2) Date: Aug. 11, 2025

(87) PCT Pub. No.: WO2024/173990
PCT Pub. Date: Aug. 29, 2024

(65) Prior Publication Data
US 2026/0112223 A1 Apr. 23, 2026

(30) Foreign Application Priority Data
Feb. 22, 2023 (AU) ................................ 2023900454

(51) Int. Cl.
*G07C 13/00* (2006.01)
*G06F 21/32* (2013.01)

(52) U.S. Cl.
CPC ............. *G07C 13/00* (2013.01); *G06F 21/32* (2013.01)

(58) Field of Classification Search
CPC ................................ G07C 13/00; G06F 21/32
See application file for complete search history.

(56) References Cited

U.S. PATENT DOCUMENTS 5,412,727 A * 5/1995 Drexler .................. G07C 13/00 705/76
5,875,432 A * 2/1999 Sehr ....................... G07C 13/00 235/386

(Continued)

FOREIGN PATENT DOCUMENTS

AU 2021105015 A4 * 5/2022 ............. G07C 13/00
JP 2020091689 A 6/2020

(Continued)

OTHER PUBLICATIONS

English Translation of JP2020091689A obtained from Google Patents on Jul. 21, 2025.

(Continued)

*Primary Examiner* — Yingying Zhou
(74) *Attorney, Agent, or Firm* — Woodard, Emhardt, Henry, Reeves & Wagner, LLP

(57) ABSTRACT

The described voting system comprises two main components: an online verification device and an offline voting device. The verification device utilises a data interface to communicate with central databases for real-time voter verification, employing biometric sensors to ensure accurate voter identification and prevent duplicate voting. This system enhances security by generating a unique verification code for each verified voter. The offline voting device, designed to be immune to network-based threats, uses this code along with biometric verification to authenticate voters. It features a user interface that employs eye gesture technology, allowing voters to select candidates privately and securely through eye movements, without any visible indication of their choices to onlookers. This setup not only protects the integrity of the vote from cyber threats but also safeguards voter privacy and reduces the potential for voter intimidation, for a free, fair, and secure voting process.

27 Claims, 4 Drawing Sheets

(56) References Cited

U.S. PATENT DOCUMENTS 7,128,263 B1 * 10/2006 Nguyen ................. G07C 13/00 705/12
7,614,551 B2 * 11/2009 Kingsley-Hefty ..... G07C 9/257 235/382
10,411,894 B1 * 9/2019 Yavnilovich .......... H04W 12/06
10,673,623 B2 * 6/2020 Horowitz .............. G06F 21/602
10,789,373 B2 * 9/2020 Reid ....................... H04L 9/083
10,979,225 B1 * 4/2021 Shiralkar .............. H04L 9/3213
11,204,991 B1 * 12/2021 Giraud .................... G06F 21/32
2006/0261951 A1 * 11/2006 Koerner .................... G01S 5/16 340/572.1
2007/0241190 A1 * 10/2007 Hotto ..................... G07C 13/00 235/386
2010/0019036 A1 * 1/2010 Hawkins ................ G07C 13/00 235/386
2013/0264384 A1 * 10/2013 Wadia .............. G06Q 20/40145 235/379
2015/0341350 A1 * 11/2015 Mandal ............... H04L 63/0838 726/6
2017/0063549 A1 * 3/2017 Zwart ..................... G06F 21/32
2018/0014777 A1 * 1/2018 Amir ................... A61M 35/003
2018/0051479 A1 * 2/2018 Suarez Lainez ........ E05B 17/22
2018/0182473 A1 * 6/2018 Schwaibold ........... G16H 20/30
2020/0027297 A1 * 1/2020 Obradovic .......... H04L 63/0407
2022/0158848 A1 * 5/2022 Finke .................... H04L 9/3247
2022/0198864 A1 * 6/2022 Ge ....................... G06Q 50/265
2022/0406115 A1 * 12/2022 Mazza ................... G07C 13/00
2023/0282052 A1 * 9/2023 Ren ....................... H04L 9/3252 235/54 R
2023/0394901 A1 * 12/2023 Sarkar ................... H04L 9/0866
2025/0335903 A1 * 10/2025 Azanza Ladrón ...... G06F 21/32

FOREIGN PATENT DOCUMENTS

JP 7055089 B2 4/2022
WO WO-2022137136 A1 * 6/2022 ............... G07C 9/20

OTHER PUBLICATIONS

English Translation of JP7055089B2 obtained from Google Patents on Jul. 21, 2025.

International Search Report, dated Apr. 30, 2024, issued in PCT/AU2024/050134, 4 pgs.

Written Opinion, dated Apr. 30, 2024, issued in PCT/AU2024/050134, 8 pgs.

Mohanta, Akash. Corruption free voting system—Biometric Authentication—Virtual Reality—Eye Tracker [Viewed on internet on Apr. 29, 2024]. <URL: https://www.youtube.com/watch?v=A7hb74y-ONaE >, Published on Oct. 27, 2023. Entire video, especially 3:00-4:30min:sec in video, retrieved as republication <URL: https://www.youtube.com/watch?v=Q5vhpoqwTL8 > on Oct. 1, 2025.

* cited by examiner

ELECTRONIC VOTING SYSTEM

FIELD OF THE INVENTION

This invention relates generally to a type of electronic voting system for use in elections

BACKGROUND OF THE INVENTION

Voter intimidation at polling booths represents a significant challenge to the integrity and fairness of electoral processes.

This form of intimidation can manifest in various ways, including physical presence of intimidating individuals or groups, verbal threats, displaying of weapons, or any other actions aimed at discouraging or influencing voters' choices.

Such practices not only infringe upon the rights of individuals to freely participate in the democratic process but also undermine the credibility of elections.

Victims of intimidation may feel coerced into voting against their preferences or may choose not to vote at all, leading to a distortion of electoral outcomes.

Furthermore, the presence of intimidation tactics can create an atmosphere of fear and tension at polling stations, impacting not only voters but also election workers and observers. The challenge is exacerbated by the difficulty in policing such behaviour, especially in regions where law enforcement may be overstretched or biased.

Furthermore, vote tampering through the hacking of network-connected electronic voting machines poses a serious threat to the integrity of electoral processes. Such machines, designed to streamline the voting and counting process, can become vulnerabilities if not adequately protected. Hackers can exploit these vulnerabilities to alter vote counts, or even disrupt the voting process, thereby undermining public trust in the electoral system.

The interconnected nature of these machines means that a breach in one area can have widespread implications, potentially compromising the results in significant ways. Additionally, the sophistication of cyberattacks continues to evolve, making it challenging for security measures to keep pace. This form of tampering not only threatens the accuracy of election outcomes but also erodes confidence in democratic institutions.

The present invention seeks to provide a way which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

The present voting system is designed to enhance the integrity and confidentiality of the electoral process.

The system is divided into two main components: an online verification device and an offline voting device. The verification device is equipped with a data interface for communication with a voter biometrics database and a verification database via a wide area network. It features a biometric sensor and a processor that runs software controllers for voter verification. These controllers include a biometric sensing controller for capturing voter biometrics, and a verification controller that checks these biometrics against the databases to ensure voter eligibility and prevent duplicate voting. Upon successful verification, a code representing this verification is generated.

The offline voting device, designed to operate without a live network connection to safeguard against cyber threats, includes a code reader, a biometric sensor, a digital display, and an eye tracker that interfaces with the display. It also houses storage for securely storing votes and a processor that controls the voting process. This process involves verifying the voter using the previously generated code and the voter's biometrics, displaying voting options on the digital display, and using the eye tracker to record voter selections based on eye gestures. This approach ensures a secure and private voting experience, with the vote recording controller preferably storing each vote anonymously in the device's storage.

The present system offers several notable advantages in enhancing the security and privacy of the voting process. By separating the voting system into two distinct devices—the verification device and the offline voting device—it addresses key vulnerabilities and concerns within electoral systems. The verification device's capability for real-time verification against a central database ensures that voter identities are accurately confirmed, and the use of biometrics adds an additional layer of security. This device's online connectivity allows for immediate updates to the verification database, effectively preventing duplicate voting and ensuring the integrity of the voter registration process.

The offline nature of the voting device makes it immune to network compromises. This significantly reduces the risk of cyberattacks, which have become a growing concern in the digital age. By not being connected to a network, the voting device safeguards the vote casting process from external tampering, ensuring that votes are cast as intended without interference.

Furthermore, the incorporation of eye gesture technology for vote selection maintains voter privacy and security. This method allows voters to make selections on a digital display in a way that is completely private, with eye gestures enabling a silent and invisible interaction with the voting interface. This technology not only ensures that the voting process is accessible and user-friendly but also addresses the issue of voter intimidation. Since third parties cannot view the voting options or detect the direction of the voter's gaze, the potential for coercion or influence at polling booths is greatly mitigated.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which.

DESCRIPTION OF EMBODIMENTS

Figure 1:
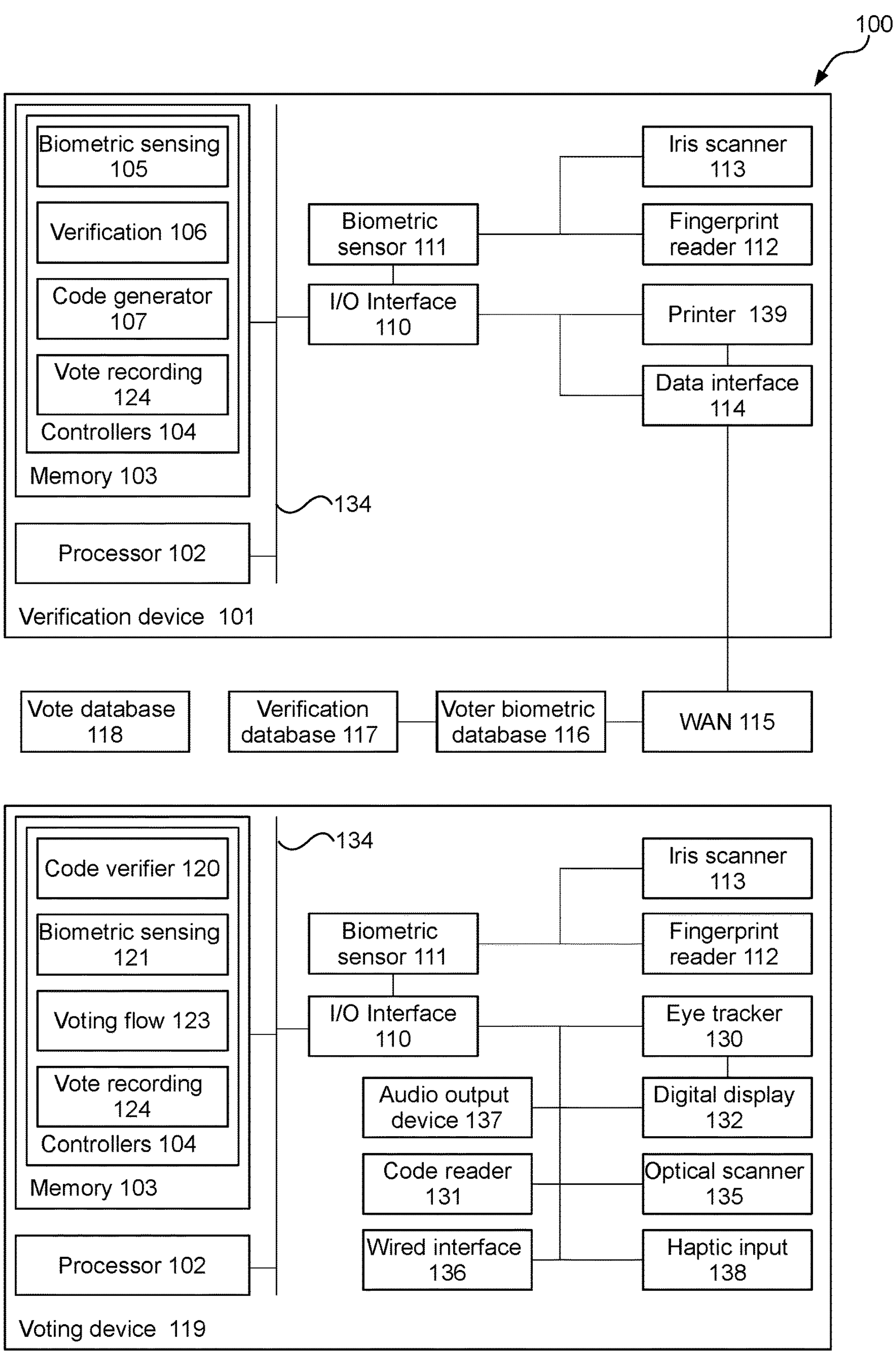
FIG. 1 shows an electronic voting system in accordance with an embodiment.

FIG. 1 shows a voting system 100 comprising at least one voter verification device 101 and at least one voting device 119. As will be described in further detail below, the voter verification device 101 is configured for voter verification whereas the voting device 119 is configured for vote casting and recording. Furthermore, the verification device 101 is an online device for instant voter verification against centralised databases whereas the voting device 119 is an off-line device thereby being immune to data network compromise.

Each device 101, 119 comprises a processor 102 for processing digital data. A memory device 103 in operable communication with the processor 102 via system bus 134 is configured for storing digital data including computer program code instructions. In use, the processor 102 fetches these computer program code instructions and associated data for interpretation and execution for the implementation of the computer functionality described herein.

These computer program code instructions may be logically divided into a plurality of computer program code instruction controllers 104.

Each device further comprises an I/O interface 110 configured for interfacing with various peripherals.

In this regard, each device 101, 119 may have the I/O interface 110 operably interfacing a biometric sensor 111. The biometric sensor 111 is configured to obtain biometrics from voters.

The biometric sensor 111 may comprise a fingerprint reader 112 configured to obtain fingerprints from voters.

The biometric sensor 111 may further comprise an iris scanner 113 configured to obtain iris scans from the voters. The iris scanner 113 is used to identify and verify individuals based on the unique patterns of their irises and operates by capturing a high-contrast photograph of a person's eye, utilising both visible and near-infrared light to illuminate the intricate structures of the iris. The scanner's software analyses the patterns of the iris, including rings, furrows, and freckles, which are unique to each individual, even in identical twins. These patterns are then converted into a digital representation, which can be stored. When verification is required, the iris scanner captures a new image of the person's iris and compares it to the stored template to confirm their identity.

In embodiments, the biometric sensor 111 comprises both the fingerprint reader 112 and iris scanner 113. It should be noted that in embodiments, other types of biometric sensors 112 may be employed for voter identification by obtaining other types of biometrics from voters, such as voice biometrics.

The I/O interface 110 of the verification device 101 may operably interface a data interface 114. The data interface 114 is configured for sending and receiving data across a wide area network 115, such as the Internet. As alluded to above, the verification device 101 is an online device, hence the data interface 114, whereas the voting device 119, which is an off-line device, is shown without such a data interface 110.

The data interface 114 may be a wired interface for sending and receiving data across an Ethernet network, a Wi-Fi interface for communicating via an Internet router or may comprise a subscriber identity module (SIM) and GSM module for sending and receiving data across a cellular network, especially for facilitating communication in remote locations.

The verification device 101 may be in operable communication with a voter biometric database 116 and a verification database 117 across the wide area network 115.

The voter biometric database 116 stores biometrics (or representations thereof) and is used by the verification device 101 for real-time verification of voter biometrics.

Biometric representations are derived from biometric signatures. For example, a biometric representation may take the form of hash of a biometric signature derived from the unique biometric data of an individual, such as their fingerprint, iris pattern, or voice. This process may involve applying a cryptographic hash function to the biometric signature's digital representation, transforming it into a fixed-size string of characters. This hash function is designed to be one-way, meaning that while it's straightforward to generate a hash from the biometric data, it is nearly impossible to reverse-engineer the original biometric data from the hash. The resulting hash is unique to the specific biometric signature, ensuring that even minimal changes in the biometric data produce a significantly different hash. This property makes hashes of biometric signatures highly secure and useful for verifying identity without storing the actual biometric data. This approach enhances privacy and security, as the hash can be compared for authentication purposes without the need to access or reveal the underlying biometric information.

The verification database 117 is configured for recording voter verifications to prevent duplicative voting. When a voter is verified successfully, the verification request is recorded in the verification database 117, thereby preventing subsequent verifications and potential duplicative voting.

The computer program code instruction controllers 104 of the verification device 101 may comprise a biometric sensing controller 105 which is configured to control the biometric sensor 111 to obtain biometrics of voters who require verification.

The controllers 104 may further comprise a verification controller 106 which is configured for verifying the biometrics obtained from the biometric sensor 111 and furthermore communicating with the verification database 117 to determine if verification for a voter has already occurred (or occurred recently) and, if not, to update the verification database 117 with the verification request.

In embodiments, the verification device 101 may further comprise a keyboard, scanner or the like to take in voter identity information, such as an identification number, which could be input via the keyboard or scanned from an identity document using the scanner.

The controllers 104 may further comprise a verification code generator 107. The verification code generator 107 is configured to generate a code following successful verification of a voter. This verification code is then used to enable the off-line voting device 119 for casting a vote. As can be appreciated, there is no data interface between the verification device 101 and the voting device 119 which could compromise the security of the voting device 119. Only the verification code is transferred between the devices 101 119 which, will be described in further detail below, may be printed on a piece of paper.

In one embodiment, the verification code generator 107 uses a secure one-time pad. In accordance with this embodiment, each verification device 101 may be paired with a respective voting device 119, each comprising a copy of the one-time pad and wherein verification and voting is done in sequence using respective codes from secret copies of their respective one-time pads.

In further embodiments, the verification code generator 107 employs a biometric representation generator controller configured to generate a representation of the biometrics (such as a hash of the biometric sensor) which is encoded within the code. As will be described in further detail below, including a representation (such as a hash) of the biometrics within the code itself allows the voting device 119 to also obtain biometrics from a verified voter for verification against the biometrics representation stored within the code to ensure that that only verified voters can cast votes.

For example, the biometric representation generator may be configured to hash fingerprint biometric data by transforming the unique characteristics of a fingerprint into a fixed-size string of characters, which is typically a one-way process. This process may start with the extraction of unique features from the fingerprint, such as minutiae points, which include ridge endings and bifurcations which are then converted into a digital template. Instead of directly hashing this template, which might be vulnerable to attacks due to its relatively stable structure, sophisticated algorithms may be applied to introduce variability and additional security measures. Salting, for instance, may be used adds a random value to the fingerprint template before hashing, ensuring that identical fingerprints result in different hash values under different salting instances. The aim of the fingerprint hashing by the biometric representation generator is to securely and irreversibly encrypt fingerprint data while allowing for the verification of identity through a matching process implemented by the voting device 119 that compare hash values rather than actual fingerprints. Similar techniques may also be applied against iris scan data.

The verification device 101 may further comprise a printer 139 configured to print an optical representation (such as a two-dimensional code) of the verification code. A two-dimensional code may be used to encode information, such as the biometric representation and which can be read by an optical scanner 135 of the voting device 119. In embodiments, the verification code may be transmitted to a mobile communication device of the voter using provided phone number and which can be displayed on screen to the optical scanner 135.

As mentioned above, the verification device 101 is used for verifying voters and preventing duplicative verification which could be used for fraudulently casting duplicative votes. As also mentioned above, the voting device 119 is configured for verifying the code generated by the verification device 101 during the verification process and, if the verification code is verified, allowing a voter to cast a vote.

The verification device 101 and the voting device 119 may be in the same location, such as at a voting station. However, in embodiments, especially where Internet connectivity in remote voting locations is problematic, the verification device 101 may be located a central location and used for generation of verification codes which are taken by voters (preferably within a time period) to cast votes at voting devices 119. In this regard the verification device 101 may be configured to encode a validity time period in the code and the code verifier controller 120 is configured to verify the validity time period.

The controllers 104 of the voting device 119 may comprise a code verifier 120 which is configured to verify the verification code generated by the verification device 101. In the embodiment wherein the verification device 101 prints the verification code using the printer 139, the voting device 119 may employ an optical scanner 135 to read and decode the verification code. The voting device 119 preferably employs an internal system clock backed up by battery in case of power outage to maintain the current date or time for the verification of a code using the encoded validity time period.

As mentioned above, the voting device 119 is preferably configured to verify biometrics against a biometric representation encoded by the verification code generated by the verification device 101 to prevent casting of votes by persons other than were verified by the verification device 101. As such, the voting device 119 may further comprise a biometric sensor 111 (which may be a fingerprint sensor 112 and/or iris scanner 113) and wherein the code verifier controller 120 is configured to verify the encrypted biometric representation against biometrics obtained from the biometric sensor 111.

The voting device 119 further comprises an eye tracker 130 operably interfacing a digital display 132.

The controllers 104 of the voting device 119 comprise a voting flow controller 123 which is configured to display voting options in a user interface displayed by the digital display 132 and the eye tracker 130 is configured to monitor the gaze of a person viewing the digital display to determine user input gestures according to gaze direction.

The digital display 132 may be part of a wearable headset. Alternatively, the digital display 132 may be fixed in place in a booth with a surrounding cover/mask against which the voter places their face to view the options displayed on the digital display concealed therein. The purpose here is that the display 132 can be viewed in private by a voter without others being able to view either the options displayed on the digital display 132 or the eyes of the user.

As such, the voting flow controller 123 monitors the gaze of the user to allow users to make selections using gaze direction. Voting options may be selected in various manners. For example, the user interface of the digital display 132 may display a series of candidates and a cursor coinciding with the gaze direction may be superimposed thereon, much like a mouse cursor. The user may use their gaze to move the cursor around the screen to select various options. Selection may be made by leaving the gaze on a particular option for duration (such as more than three seconds), or blinking to make a selection or the like. A selection may be confirmed by an audible beep or the like using an audio output device 137.

For example, the user interface displayed by the digital display may display three candidates and a gaze cursor coinciding with the gaze direction. The user moves their eyes around to move the cursor onto one of the candidates and leaves their gaze on the candidate for more than three seconds. The voting flow controller 123 then takes this as a selection of the candidate and may then display a confirmation requesting the voter to confirm the selection with yes or no options. Selection of the yes option would confirm the vote whereas selection of the no option would return to the candidate selection interface.

In embodiments, blind voters may cast votes by interacting with the audio output device 137 and an input device. Specifically, for blind voters, as opposed to the voting flow controller 123 displaying the options on the digital display 132, the voting flow controller 123 may output options audibly using the audio output device 137. For example, the blind voter may wear an audio headset through which options are played and wherein the voter provides indications of a selection using an input device, such as a button, haptic device or the like. For example, the vote flow controller 123 may play out audio using the audio output device 137 indicating to the voter that three candidates are going to be mentioned in that the candidate should press the button simultaneously with the mention of the name of a candidate for selection. In embodiments, the vote flow controller 123 may be configured to randomise the order of options for each of voting session to eliminate voter response guesswork by bystanders who could attempt to deduce a voting selection by the time taken to respond.

The verification device 101 may encode an indication of a blind voter using verification code which is used to authorise the voting device 119. In embodiments, the voter biometric database 116 comprises a field indicating whether a voter is blind. As such, when the verification controller 106 communicates with the voter biometric database 116, it will receive an indication therefrom that the voter is blind which is encoded in the verification code. As such, when the voting device 119 decodes the verification code, it will decode the indication that the user is blind and thereby cause the flow controller 123 to output the options audibly as opposed to visually using the digital display 132.

The controllers 104 may further comprise a vote recording controller 124 which is configured for storing cast votes within the storage 125.

Preferably, the storage 125 is encrypted so as to prevent tampering therewith. In embodiments, cryptographic keys uniquely associated with the voting device 119 may be required to decrypt the storage 125.

The voting device 119 may be used to record a number of votes and, after a voting session, the data within the encrypted storage 125 securely transferred (preferably also encrypted form) to a central server for recording in a vote database 118.

Preferably, the storage 125 stores votes in an anonymized form so that a voter ID cannot be associated with a cast vote.

Figure 2:
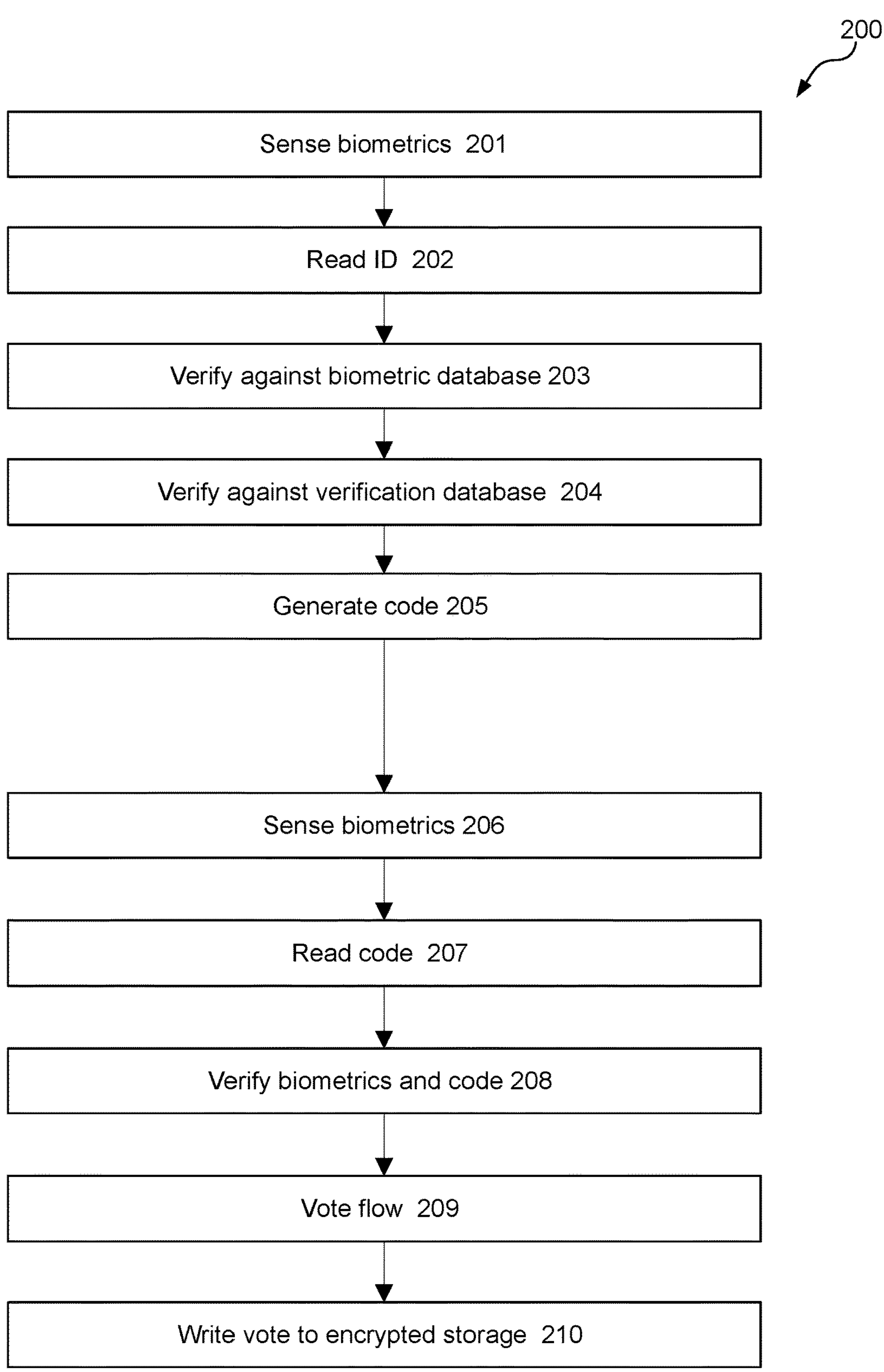
FIG. 2 shows exemplary processing by the system of FIG. 1.

FIG. 2 shows an exemplary method 200 of votes casting using the system 100 in accordance with a preferred embodiment wherein, at step 201 the biometric sensor controller 105 is configured to scan biometrics of a voter using the biometric sensor 111. Optionally at step 202, the verification device 101 is configured to read a voter ID from an identity document. Alternatively, the voter ID may be input using a keyboard.

At step 203 the verification controller 106 is then configured to verify the biometrics against the voter biometrics database 117. The voter ID may be transmitted to the voter biometric database 116 along with the biometrics (or at least a representation thereof) so that the voter biometrics database 116 can verify the stored biometrics (or representation thereof) against the provided ID.

Upon successful verification of the voter biometrics, the verification controller 106 may further verify the verification against the verification database 117 at step 204 to determine if a verification has already occurred and, if not, update the verification database 117 accordingly.

At step 205 the verification code generator 107 then generates the verification code of the successful verification which may be printed on a piece of paper as a 2D code using the printer 139.

The voter can then take this piece of paper with the printed verification code to cast a vote at the off-line voting device 119 whereby, at step 206, the biometric sensor controller 111 of the voting device 119 is configured to sense the biometrics of the voter using the biometric sensor 119, such as by taking a fingerprint reading using the fingerprint reader 112 and/or an iris scan using the iris scanner 113.

The code verifier controller 120 is further configured to read the code step 207 using the code reader 131.

As such, at step 208, the code verification controller 120 is configured to verify the code and the biometrics. As mentioned above, in a preferred form, the code itself preferably encodes a representation of the biometrics (such as a hash) which is verified by the code verifier controller 120 against the biometrics obtained using the biometric sensor 111 of the voting device 119.

Following successful code verification, the voting flow controller 209 is configured to display voting options at step 209 using the digital display 132 and to record eye gesture voter interactions with the voting options using the eye tracker 130 to record a vote. Alternatively, voting would be conducted audibly for blind voters as described above.

In embodiments, the voting device 119 may be configured to continuously or iteratively verify the biometrics of the voter using the biometric sensor 111 during voting. For example, during the voting process, the iris scanner 113 may continuously scan an iris of a voter viewing the digital display 132, and/or the voter may be required to keep their finger on the fingerprint reader 112 which is constantly scanned.

Once a vote is cast, the vote recording controller 124 is configured to store the vote in the storage 125.

During the voter casting process, the voting device 119 is not connected to a wide area network, such as the Internet, so that the voting device 119 is immune from network compromise.

Following a voting session, the data stored within the storage 125 can be securely transmitted to the vote database 118 for recording. In embodiments, the storage 125 (such as in the form of a hard drive or solid-state drive) is physically removed from the voting device 119 and connected to a data interface to download the data to the vote database 118.

In alternative embodiments, the storage 125 is connected a point-to-point wired data interface 136 (i.e., not a data network which could be compromised by other computers on the network), such as using a serial bus data cable or the like to transfer the recorded data to the vote database 118. The voting device 119 may be configured so that only the vote recording controller 125 may write data to the storage 125. In other words, the voting device 119 may be configured so that data cannot be written to the storage 125 via the data interface.

Once voting has completed using various voting devices 119, the results recorded in the vote database 180 may be tailored to determine the election result. As alluded to above, the unique IDs associated with each voting device 119 may be confirmed to eliminate any duplicate records within the database 118.

Figure 4:
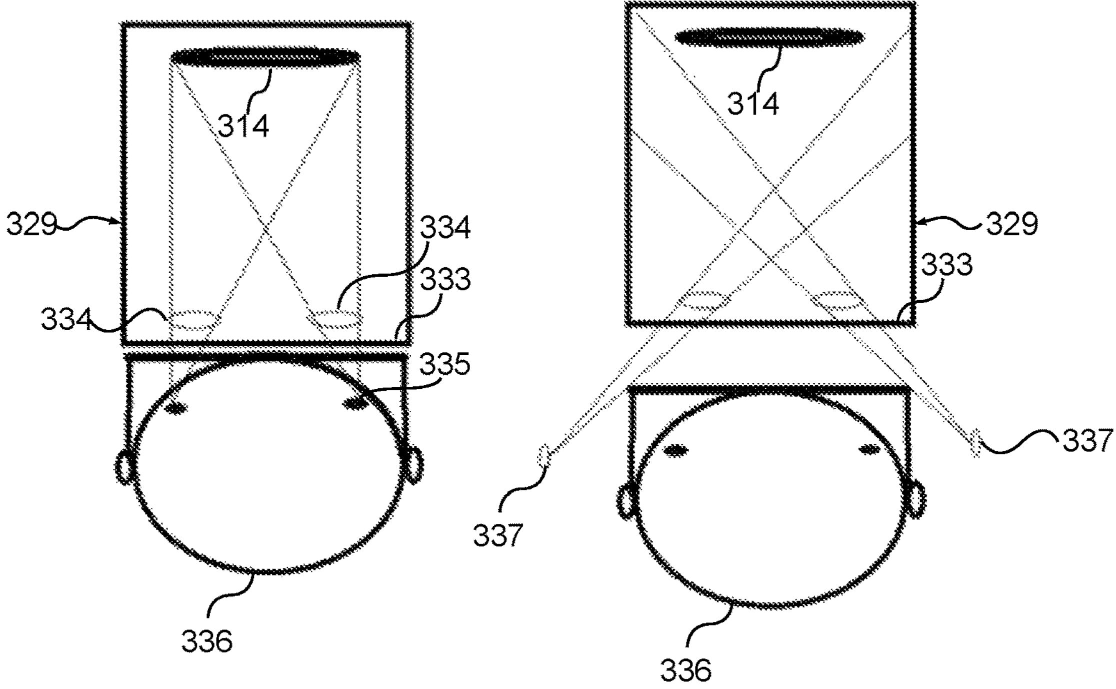
FIG. 4 shows a headset arrangement to prevent viewing of the digital display of the headset by trespassers in accordance an embodiment.

FIG. 4 shows an embodiment of headset 329 comprising a front panel 333 in front of the digital display 132 and wherein the panel 333 comprises eye apertures 334 corresponding in position with the eyes 335 of a voter 336. As can be seen, the display 132 would not be visible from the gaze of trespassers 337 standing adjacent the voter.

In further embodiments, the headset 329 comprises a secondary front panel (not shown) spaced away from the front panel 333 and itself having respective eye apertures 334 therethrough. The eye apertures 334 of the panels 333 are in alignment to thereby create tunnel vision therefore requiring the voter to stand an exact alignment with the apertures 334 and greatly diminishing the likelihood of viewing of the digital display 132 by the trespassers 337.

In embodiments, a replaceable hygienic disposable cover with corresponding eye apertures may be placed over the panels 333.

Figure 3:
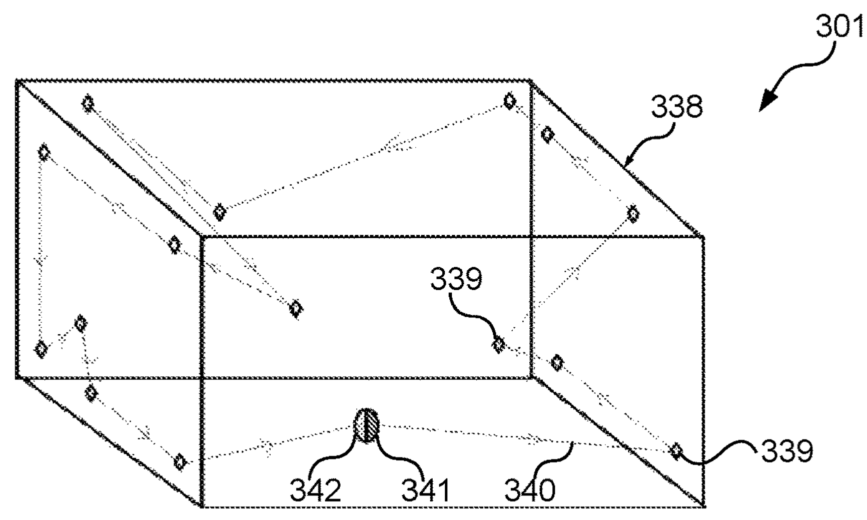
FIG. 3 shows a temper detection subsystem in accordance with an embodiment.

FIG. 3 shows an embodiment of a voting booth 301 for the voting device 119 comprising a housing 338 having a tamper sensing subsystem installed therein. The tamper sensing subsystem comprises a plurality of reflectors 339 configured to reflect a beam 340 emitted from a transmitter 341 towards a receiver 342. The tamper sensing subsystem is configured to detect tampering by interruption of the beam 340. Preferably the reflectors 339 are installed on every panel 343 of the housing 338 so that the displacement of any panel of the housing 338 would cause the beam 340 to go out of alignment and thereby be detectable.

Furthermore, any object intruding into the housing 338 may interrupt the beam 340.

In embodiments, the transmitter 341 is configured to encode a code by pulsing the beam of light 341 and wherein the receiver 342 is further configured to decode the code and compare to the code sent by transmitter to detect tampering. This may prevent tampering by attempting to direct a beam from another source towards the receiver 342.

If detecting tampering, the voting device 119 may take various actions, including terminating the voting process, preventing further voting attempts, activating an alarm (such as an internal or external alarm system).

In embodiments, wherein the tampering issue is rectified (such as wherein a misaligned panel is restored), the voting device 119 may be configured to remain inhibited until such time that it is manually reset.

Figure 5:
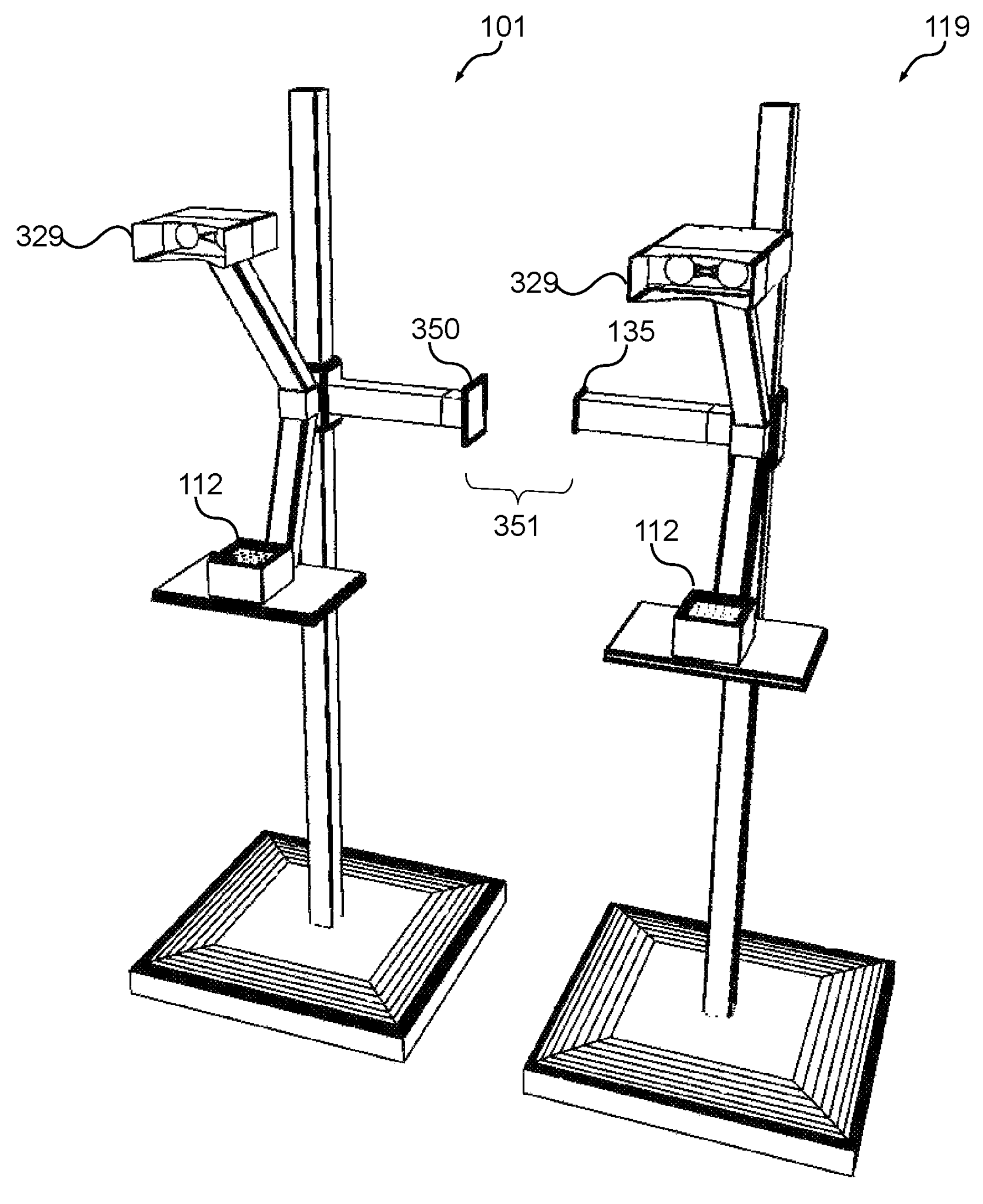
FIG. 5 shows an embodiment wherein a verification code is optically communicated from a verification device to a voting device.

FIG. 5 shows an embodiment wherein the verification device 101 and the voting device 119 are standalone devices, placed within proximity of each other and wherein the verification code is transmitted via an air gapped optical communication channel 351 from the verification device 101 to the voting device 119. Specifically, the verification code generated by the verification device 101 is displayed on a digital display 350 of the verification device 101 which is optically read by the optical scanner 135 of the voting device 119. In this way, the voting device 119 may be kept offline without potential for computer network compromise whilst reading the verification code optically from the verification device 101, which is connected to the wide area network 115.

The digital display of 350 may be concealed so that the code displayed thereon cannot be viewed outside the field of view of the scanner 135. In embodiments, as opposed to utilisation of a digital display 350, the verification device 101 may comprise a light emitter (such as a high-intensity laser transmitter) which transmits the code optically to an optical receiver (such as a photosensitive diode) of the voting device 119. In further embodiments, the devices 101, 119 may be connected by fibre-optic cable.

It should be noted that whereas the present system 100 has been described with reference to voting, it may be used for other types of processes requiring anonymity, such as systems for obtaining employee feedback.

In embodiments, the verification code may encode at least one of a unique ID of the verification device 101, a unique random alphanumeric number which is unrelated to the voter or the verification device 101, a digital representation or hash of the iris scan (or fingerprint in case of blind voters), a timestamp and an indication as to whether the voter is blind.

The voting device 119 may record a verification identifier (which can be the unique random alphanumeric number obtained from the verification device 101) and the vote. Preferably, the voting device 119 does not include details of the voter in relation to the vote.

For arrangements wherein voter can only vote from one designated voting device 119, the voting device 119 may record the verification code or a hash thereof to detect the same verification code is used to gain and therefore to reject any subsequent attempts to use the verification code on the same voting device 119. Alternatively, if such a vote is recorded, at periodic process may scan the storage of the voting device 119 or the voter database 119 to remove duplicate entries.

For arrangements wherein voter can vote from any voting device 119, duplicate votes can only be eliminated once they are fed by multiple voting devices 119 to the voting database 118. In this regard, the unique random alphanumeric number generated by the verification device 101 may be obtained by the voting device 119 when scanning the verification code and which may be transmitted to the voter database 118. As such, the voter database 118 may reject duplicate entries having the same unique random alphanumeric number, or alternatively the voter database 118 may be scanned periodically to remove voter entries having duplicate alphanumeric numbers.

Alternatively, for the arrangement shown in FIG. 5 wherein the devices 101, 119 communicate with each other optically verification may not be required because verification and voting done at the same time.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A voting system comprising:

a verification device comprising:

- a data interface in operable communication across a wide area network with:
  - a verification database; and
  - a centralized voter database configured to store at least one of voter biometrics data and voter identification data;
- a first biometric sensor;
- a first processor executing first computer program instruction controllers configured for voter verification, the first controllers comprising:
  - a first biometric sensing controller configured to sense biometrics of a voter;
  - a verification controller configured to:
    - verify voter identity data against the centralized voter database to generate a verification request; and
    - verify the verification request against the verification database and update the verification database;

a code generator controller configured to:
generate a code of the successful verification of the voter; and
encode a representation of the biometrics in the code;
an offline voting device, which operates without a live network connection, comprising:
a code reader;
a second biometric sensor;
a digital display;
an eye tracker operably interfacing the digital display;
storage; and
a second processor executing second computer program instruction controllers configured for vote recording, the second controllers comprising:
a second biometric sensing controller configured to sense the biometrics of the voter;
a code verifier controller configured to:
read the code using the code reader and decode the representation from the code; and
verify the code and the biometrics using the representation;
a voting flow controller configured to:
display voting options using the digital display; and
record eye gesture voter interactions with the voting options using the eye tracker to record a vote; and
a vote recording controller configured to store the vote in the storage and wherein the offline voting device is configured to continuously monitor the biometrics of the voter using the biometric sensor during voting.

2. The system as claimed in claim 1, wherein the verification code generator generates the code from a one-time pad and the code verifier controller checks the code against a corresponding code selected from an associated one-time pad.

3. The system as claimed in claim 1, wherein the representation is a hash of the biometrics.

4. The system as claimed in claim 3, wherein a random salt is added to the hash.

5. The system as claimed in claim 1, wherein the code generator controller is configured to generate the code in as an optical code and wherein the offline voting device comprises an optical scanner to decode the optical code.

6. The system as claimed in claim 5, wherein the verification device comprises a printer which is configured to print the optical code on paper.

7. The system as claimed in claim 5, wherein the verification device is configured to transmit the optical code to a mobile communication device associated with the voter.

8. The system as claimed in claim 1, wherein the code generator controller is configured to encode a validity time period in the code; and
the code verifier controller is configured to verify the validity time period.

9. The system as claimed in claim 1, wherein the storage is encrypted storage and wherein a cryptographic key uniquely associated with the offline voting device is required to decrypt the storage.

10. The system as claimed in claim 1, wherein the vote recording controller stores the vote in an anonymized form so that a voter ID cannot be associated with a cast vote.

11. The system as claimed in claim 1, wherein:
the code generator controller is configured to generate the code with an indication if the voter is blind; and
the code verifier controller configured to detect the indication that the voter is blind to enable the voting flow controller to output the voting options using an output audio device and to receive selections thereof using an input device to record the vote.

12. The system as claimed in claim 11, wherein at least one of the following conditions applies: (i) the verification controller is configured to receive the indication that the voter is blind from the voter biometrics database; (ii) the voting flow controller is further configured to randomize the order of voting options.

13. The system as claimed in claim 1, wherein the storage is configured for connection via a point-to-point wired data interface to transfer the vote to a vote database.

14. The system as claimed in claim 1, wherein the offline voting device is configured so that only the vote recording controller may write data to the storage.

15. The system as claimed in claim 1, wherein the verification device optically transmits the code to the offline voting device.

16. The system as claimed in claim 15, wherein the verification device optically transmits the code to the offline voting device across an airgap.

17. The system as claimed in claim 1, wherein the verification device is configured to generate a unique ID for the verification which is obtained by the code reader of the offline voting device and wherein duplicate votes are detected by duplicate unique IDs.

18. The system as claimed in claim 17, wherein the vote recording controller stores the unique ID against the vote.

19. The system as claimed in claim 1, wherein the system is configured for recording selection of a voting option by detecting gaze directed to the voting option for more than a time period threshold.

20. The system as claimed in claim 19, wherein the system is further configured for confirming the selection by displaying a confirmation having confirmation options and detecting gaze directed to one of the confirmation option for more than a time period threshold.

21. The system as claimed in claim 1, wherein the system is configured for randomising on-screen positional display of the voting options.

22. The system as claimed in claim 11, wherein the output audio device comprises a headset.

23. The system as claimed in claim 1, wherein the offline voting device comprises a voting booth comprising a housing comprising a tamper sensing subsystem comprising a plurality of reflectors configured to reflect a beam from a transmitter to a receiver and wherein tampering is detected by the tamper sensing subsystem by interruption or discontinuity of the beam.

24. The system as claimed in claim 23, wherein the transmitter is configured to transmit the beam with an encoding and wherein the receiver is configured to decode the encoding for verification.

25. The system as claimed in claim 1, wherein the offline voting device comprises a headset comprising the digital display therein and wherein the headset comprises a front panel having a pair of eye apertures.

26. The system as claimed in claim 25, wherein the headset comprises a secondary front panel spaced apart from the front panel and having a respective further pair of eye apertures therethrough.

27. The system as claimed in claim 1, wherein the verification device is configured to verify the voter using at least one of: (i) biometric data sensed by the first biometric sensor; and (ii) voter identification data received via an input device.

* * * * *